March 9, 1943.  E. C. GLITZKE  2,313,535
BITE REGISTERING DEVICE
Filed March 30, 1942
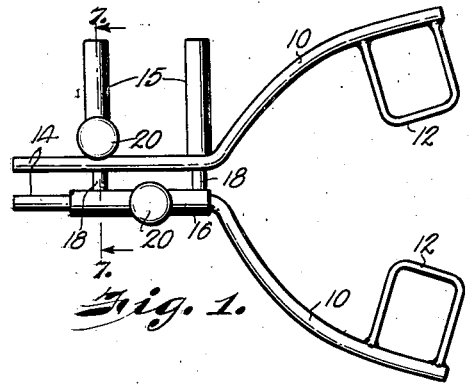
Fig. 1.
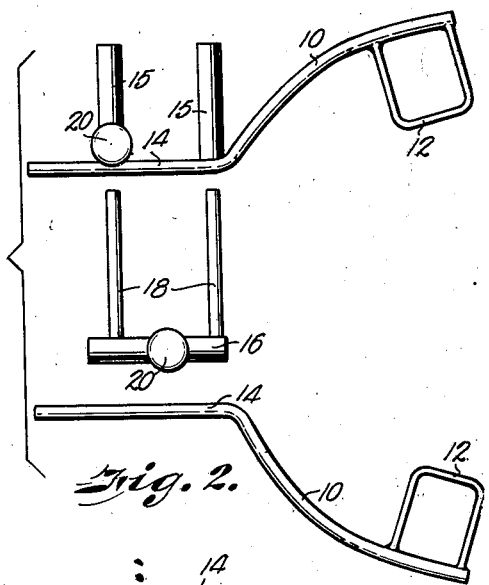
Fig. 2.
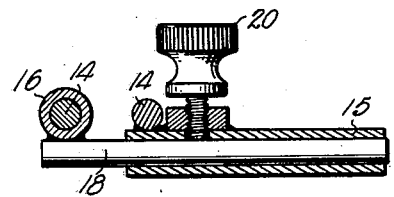
Fig. 7.
Fig. 3.
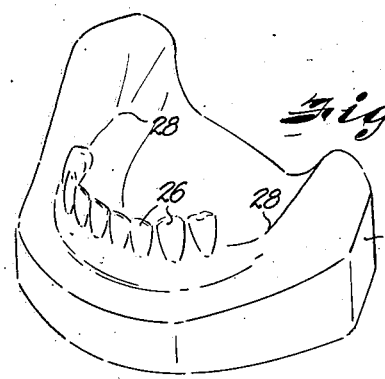
Fig. 4.
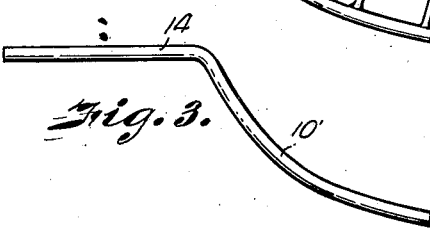
Fig. 6.
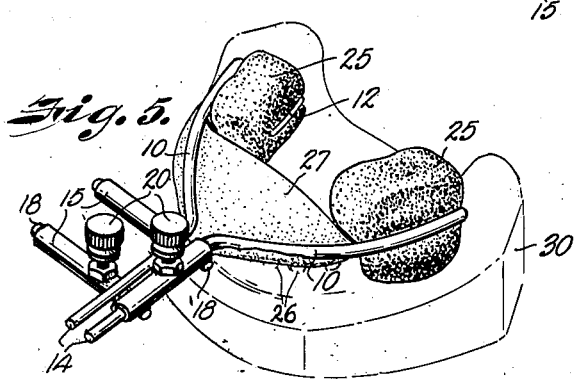
Fig. 5.
INVENTOR.
E. C. Glitzke
BY Chas. W. Gerard
ATTORNEY.

Patented Mar. 9, 1943

2,313,535

UNITED STATES PATENT OFFICE 2,313,535

BITE REGISTERING DEVICE

Ewald C. Glitzke, Kansas City, Mo.

Application March 30, 1942, Serial No. 436,762

4 Claims. (Cl. 32—19)

The present invention relates to dental appliances, with particular reference to instruments employed in the making of artificial dentures or bridge work in dental operations.

The principal object in view is to device an improved appliance for obtaining accurate bite registrations and by the use of which the operator is enabled to secure a substantially perfect working relationship between upper and lower dental casts when these are to be mounted on an articulator.

For accomplishing this purpose I provide a novel instrument for registering teeth impressions as well as dental recesses and cavities, and in which the essential feature of novelty lies in the support of the impression material from the buccal side of the dental arches or entirely outside the dental structures in the mouth, whereby all interference from the tongue inside the arches or teeth structures is eliminated and a more accurate as well as more comfortable operation is assured.

It is also sought to device a simple construction of relatively few parts which are not only adjustable and conveniently operated but may also be readily taken apart, as may be required for cleaning or sterilizing.

With the foregoing general objects in view the invention will now be described by reference to the accompanying drawing illustrating one form of device found suitable for the embodiment of my proposed improvements, after which those features and combinations deemed to be novel and patentable will be particularly set forth and claimed.

In the drawing—

Figure 1 is a plan view showing a dental appliance constructed in accordance with the present invention;

Figure 2 is a similar view showing the parts of the device detached and in separated relation;

Figure 3 is a plan view showing a modified form of one of said parts;

Figures 4 and 5 are perspective views of a dental arch or cast of the contour of a lower jaw before and after, respectively, the mounting of the bite registering device thereon; and Figure 6 is a side elevation illustrating said bite registering device in operative position between upper and lower dental casts.

Referring now to the drawing in detail, and more particularly to Figures 1 and 2, the improved bite registering device is illustrated as comprising a pair of curved arms or bows 10, the ends of which are provided on their inner or concave sides with loops 12 for wax holding purposes as hereinafter explained. These arms 10 are also formed with straight stem portions 14, to one of which is suitably secured (as by soldering) a pair of sleeves 15 in spaced relation and at right angles to said stem portion. The stem 14 of the other arm 10 is mounted slidably in another sleeve 16 to which are also secured a pair of spaced pins or rods 18 adapted to be slidingly received within the sleeves 15 or in the relation illustrated in Figure 1. Clamping screws 20 are provided on the sleeve 16 and on one of the other sleeves to secure the parts in any desired adjusted relation.

As already pointed out the function of the appliance is to enable the operator to obtain accurate biting or articulative relationship of the upper and lower dental casts when these are being prepared for mounting on an articulator. For this purpose, therefore, the operator obtains a bite registration directly from the patient's teeth at the time the impressions are taken for the casts; that is to say, the operator secures a bit registration at the outset, and preserves the same for use in securing proper adjustment of the dental casts when these are to be mounted on the articulator. Accordingly the operator assembles the parts of the appliance in the relation illustrated in Figure 1, with an adjustment of the space between the arms or bows 10 to approximate the size of the patient's arches—but slightly larger than the contour of said arches. On each of the loops 12 is then mounted a block of impression wax 25 (as represented in Figures 5 and 6); and across the space between the arms or bows 10 and in position to be gripped by the anterior teeth in the biting action is mounted a piece or section of a sheet of so-called base plate wax 27.

As the loops 12 project inwardly or toward each other, the arms or bows 10 are adjusted and clamped by the screws 20 so that the blocks of wax 25 are positioned in those spaces or recesses of the jaws where teeth may be missing (as would correspond to the recesses 28 posterior to the teeth 26 of the dental casts 30 shown in Figures 4 and 6); or, in the case of a single tooth somewhat to the rear of the other teeth, such loop 12 and its block of impression wax may be positioned directly over such lone tooth, allowing the latter to bite and penetrate through the wax or within the loop 12.

When introduced into the patient's mouth and rested upon the lower teeth, or in the same relationship as illustrated by its position upon the lower cast 30 in Figure 5, the patient executes a closing action of the teeth in centric relation—in the manner represented by the position of the device with reference to both dental casts in Figure 6. This of course produces a register of the teeth impressions in the wax 27 and also of the ridges where the posterior teeth are missing.

Since the supporting frame for the wax material extends entirely outside the teeth formations, it is obvious that there is no projection or obstruction on the inside of those formations, and hence no contact with or opportunity for interference from the patient's tongue. This of course makes for much greater accuracy of adjustment and carrying out of the bite-registering operation, as well as much greater ease and comfort for the patient during that operation.

Later, when the dental casts have been made and are ready for mounting upon an articulator, the bite registration which has been preserved by the foregoing procedure now facilitates a very accurate positioning of the casts in their correct working relationship as illustrated in Figure 6, ready for mounting on the articulator—as will be readily understood.

In unilateral cases where it is necessary to obtain ridge or gum impressions at only one side of the mouth, a plain bow 10' (without any loop 12) as illustrated in Figure 3, is used on that side where no such impressions are to be made, while the rest of the operation employing the wax material 27, and the impression wax 25 mounted on the loop 12 of the other arm or bow 10, remains the same as already described.

The instrument can obviously be adjusted to any size of mouth or dental arch, as well as any anterior-posterior position, and can also be used either side up, as best suits the conditions of use.

It will therefore be apparent that I have devised a very practical and highly efficient device for obtaining accurate bite registrations in connection with either partial denture or removable bridge work, as the case may be.

While I have illustrated and described what I now regard as the most practical and preferred form of the appliance, for embodying my improvements, I desire to be understood as reserving the right to make all changes or modifications falling within the spirit and scope of the invention as defined by the appended claims.

Having described my invention, what I claim and desire to secure by Letters Patent is:

1. A dental bite-registering appliance comprising a pair of curved bows for carrying wax impression material, said bows having a spread sufficient for extending exteriorly of the teeth to which application is made, the anterior end portions of said bows having sleeve elements at right angles to each other and rod elements fitting said sleeve elements whereby said bows may be relatively adjusted into different anterior-posterior relations and also laterally for varying the spread relation thereof, and screws carried by said sleeves for clamping said rod elements to secure the parts in adjusted relation.

2. A dental bite-registering appliance comprising a pair of curved bows for carrying wax impression material and formed with parallel stem portions and also having a spread between the bows sufficient to extend exteriorly of the teeth to which application is made, one of said stem portions being fitted with an adjustable sleeve carrying parallel rod elements and the other of said stem portions having parallel sleeves fixed thereto in position for adjustably accommodating said rod elements.

3. A dental bite-registering appliance comprising a pair of curved bows for carrying wax impression material, said bows having a spread sufficient for extending exteriorly of the teeth to which application is made, adjustable connections between the anterior end portions of said bows and arranged to allow said bows to be spread apart into various different spread relations and also shifted relative to each other into different anterior-posterior relations, and means for securing said adjustable connections for holding the parts in their different adjusted positions.

4. A dental bite-registering appliance comprising a pair of curved bows for carrying wax impression material and formed with parallel stem portions and also having a spread between the bows sufficient to extend exteriorly of the teeth to which application is made, said stem portions being provided with connections comprising interengaging sleeve and rod elements in right-angular relation for permitting said bows to be separated into various different spread relations and also shifted relative to each other into different anterior-posterior relations, and clamping means for securing said connections and thereby holding the parts in their different adjusted positions.

EWALD C. GLITZKE.